A. G. W. FOSTER.
CULTIVATOR AND SUBSOILER.
No. 176,466. Patented April 25, 1876.
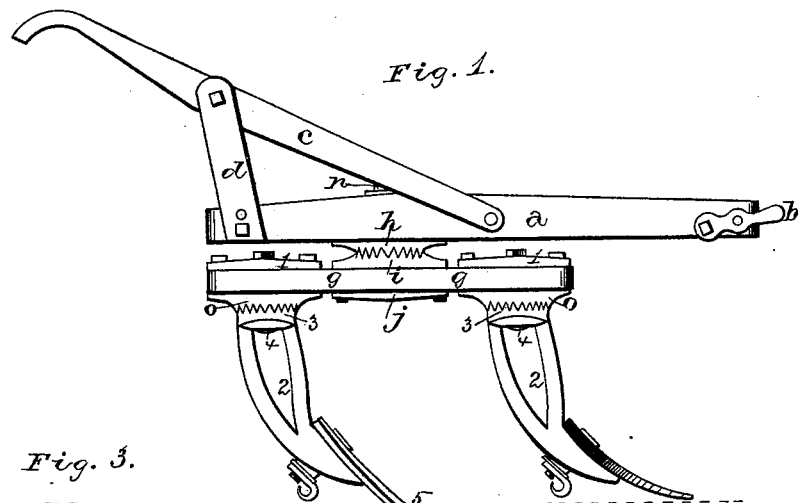
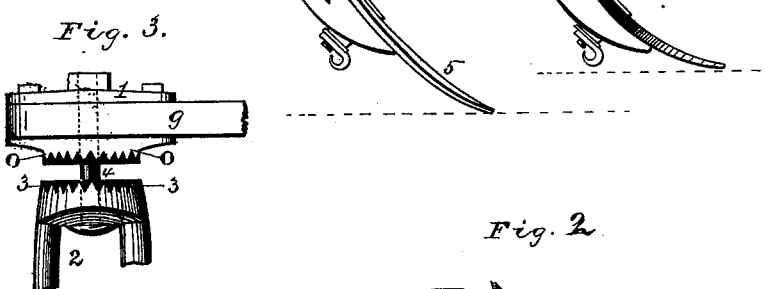
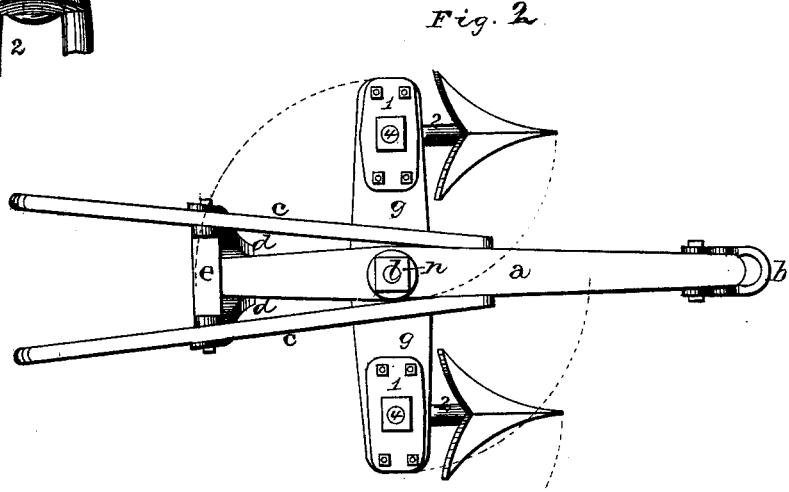
WITNESSES.
J. Wm. Garner
Frank M. Burnham
INVENTOR.
A. G. W. Foster
per
F. A. Lehmann
atty.

UNITED STATES PATENT OFFICE.

ABRAHAM G. W. FOSTER, OF NEWNAN, GEORGIA.

IMPROVEMENT IN CULTIVATORS AND SUBSOILERS.

Specification forming part of Letters Patent No. 176,466, dated April 25, 1876; application filed December 1, 1875.

*To all whom it may concern:*

Be it known I, ABRAHAM G. W. FOSTER, of Newnan, in the county of Coweta and State of Georgia, have invented certain new and useful Improvements in Combined Cultivators and Subsoilers; and I do hereby declare the following to be a full, clear, and exact description of the invention, such as will enable others skilled in the art to which it pertains to make and use it, reference being had to the accompanying drawings, which form part of this specification.

My invention relates to an improvement in combined cultivators and subsoilers; and it consists in the arrangement and combination of parts that will be more fully described hereafter, whereby the implement can be used as a cultivator or a subsoil-plow, as may be desired.

The accompanying drawings represent my invention.

$a$ represents the beam; $b$, an adjustable clevis; $c$, the handles; $d$, the supports for the handles; and $e$, a brace, placed between the handles, all of which parts may be constructed in any desired manner. Secured in any suitable manner to the under side of the beam and to the center of the cross-bar $g$ are the circular ratchets or chuck-plates $h\,i$, by means of which the cross-bar may be turned in any desired relation to the beam, and then rigidly secured in position. On the under side of the cross-bar $g$ is placed an iron plate, $j$, which serves to protect the bar from the head of the bolt, and passing up through this plate, the cross-bar, and beam is the screw-bolt $l$, which serves to clamp the beam and bar together. By loosening the nut $n$ on the upper end of this bolt the ratchets may be disengaged, and the cross-bar turned freely around in any direction. To the under side of the cross-bar at each end are secured other ratchets $o$, and upon the top of the bar, just over each ratchet, is an iron plate, 1. The standards 2, constructed as shown, are adapted to receive different-shaped shovels, according to the work required, and have their tops formed into ratchets 3, so as to mesh with the ratchets $o$. By this construction of parts the standards can be adjusted in any desired position, so as to conform to the position of the cross-bar. Passing up through the heads of the standards, ratchets, cross-bar, and plates are the screw bolts 4, by means of which the standards are clamped in position.

When it is desired to use the implement for cultivating, the cross-bar is turned at a suitable angle to the beam, and each of the standards provided with a suitable shovel.

When it is desired to use the implement as a subsoiler, the cross-bar is turned so as to be directly under, and in a line with, the beam, the standards are turned to the front, and the front one provided with a suitable shovel, while the rear one is provided with a subsoil-shovel, 5.

By the above-described combination of parts two implements are combined in one.

Having thus described my invention, I claim—

The cross-bar $g$, swiveled to the plow-beam by the bolt $l$, and the ratchet-plates $h\,i$, in combination with standards 2, having serrated top notched plate $o$, and bolt 4, whereby said cross-bar is adjusted in line with the beam for a subsoiler, or at an angle with it for a cultivator, as described.

In testimony that I claim the foregoing I have hereunto set my hand this 22d day of November, 1875.

ABRAHAM G. W. FOSTER.

Witnesses:
JOHN S. BIGBY,
ORLANDO McCLENDON.